(12) United States Patent
Givental et al.

(10) Patent No.: US 11,663,329 B2
(45) Date of Patent: May 30, 2023

(54) SIMILARITY ANALYSIS FOR AUTOMATED DISPOSITION OF SECURITY ALERTS

(71) Applicant: International Business Machines Corporation, Armonk, NY (US)

(72) Inventors: Gary I. Givental, Bloomfield Hills, MI (US); Aankur Bhatia, Bethpage, NY (US); Kyle Proctor, Holly, MI (US); Rafal Hajduk, Brzezina (PL)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/195,843

(22) Filed: Mar. 9, 2021

(65) Prior Publication Data
US 2022/0292186 A1    Sep. 15, 2022

(51) Int. Cl.
*G06F 21/55* (2013.01)

(52) U.S. Cl.
CPC ...... *G06F 21/554* (2013.01); *G06F 2221/034* (2013.01); *G06F 2221/2101* (2013.01)

(58) Field of Classification Search
CPC ............. G06F 21/554; G06F 2221/034; G06F 2221/2101
See application file for complete search history.

(56) References Cited

U.S. PATENT DOCUMENTS

| | | | |
|---|---|---|---|
| 9,571,510 B1 | 2/2017 | Shen | |
| 10,263,998 B1* | 4/2019 | Bhatt | H04L 63/1416 |
| 10,805,327 B1* | 10/2020 | Grilli | G06F 40/242 |
| 11,269,978 B2* | 3/2022 | Cohen | G06F 21/55 |
| 2015/0163242 A1 | 6/2015 | Laidlaw | |
| 2018/0367561 A1 | 12/2018 | Givental | |
| 2019/0260780 A1 | 8/2019 | Matthew | |
| 2019/0370610 A1* | 12/2019 | Batoukov | G06F 11/0709 |

(Continued)

FOREIGN PATENT DOCUMENTS

WO    2017204819 A1    11/2017

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Christopher A Revak
(74) *Attorney, Agent, or Firm* — Kimberly S. Zillig

(57) ABSTRACT

A method, a computer program product, and a system for performing a of threat similarity analysis for automated action on security alerts. The method includes receiving, by a threat similarity analysis system, a security alert relating to a security from a threat disposition system within an environment, performing, by the threat similarity analysis system, a similarity analysis on the security alert using a machine learning model. The similarity analysis compares the security alert with previous security alerts within a time window. The threat similarity analysis system can apply a cosine similarity analysis to perform the similarity analysis. The method also includes determining, based on the similarity analysis, the security alert matches at least one previous security alert from the previous security alerts within a predetermined degree, and associating the security alert into a same security incident as the previous security alert determined by similarity analysis.

20 Claims, 8 Drawing Sheets

(56) References Cited

U.S. PATENT DOCUMENTS

| | | |
|---|---|---|
| 2020/0042700 A1 | 2/2020 | Li |
| 2020/0267183 A1* | 8/2020 | Vishwanath ........ H04L 63/1483 |
| 2020/0320845 A1* | 10/2020 | Livny ................... G06F 21/566 |
| 2021/0266345 A1* | 8/2021 | Chen ................... H04L 63/1425 |
| 2022/0094710 A1* | 3/2022 | Riahi Manesh ...... G06F 18/214 |

* cited by examiner

SIMILARITY ANALYSIS FOR AUTOMATED DISPOSITION OF SECURITY ALERTS

BACKGROUND

The present disclosure relates to security alerts, and more specifically, to performing a similarity analysis on security alerts to determine whether an action should be performed on a security threat relating to the alert.

Managed security services manage an organizations' security needs by overseeing network and information system security for the organization. The managed security services can include round-the-clock monitoring and management of intrusion detection systems and firewalls, performing security assessments and security audits, as well as responding to security-related emergencies.

Threats refer to potential causes of harm to an environment. These threats can be caused by either nonhuman events or by humans. For example, a nonhuman threat can include natural disasters, loss of electrical power, and failure of a component. Human threats can be benign or malicious. A non-malicious threat can include accidentally deleting information, careless data entry, or sending an e-mail to the wrong person. On the other hand, malicious human-caused harm intentionally wants to cause harm to an environment and is often referred to as an attack or a malicious computer security event.

SUMMARY

Embodiments of the present disclosure include a computer-implemented method of threat similarity analysis for automated action. The computer-implemented method includes receiving, by a threat similarity analysis system, a security alert relating to a security threat from a threat disposition system, performing, by the threat similarity analysis system, a similarity analysis on the security alert using a machine learning model. The similarity analysis compares the security alert with previous security alerts generated within a time window. Additionally, the threat similarity analysis system can apply a cosine similarity analysis to perform the similarity analysis. The computer-implemented method also includes determining, based on the similarity analysis, the security alert matches at least one previous security alert from the previous security alerts within a predetermined set similarity percentage, and associating the security alert into a same security incident as the previous security alert determined by similarity analysis.

Additional embodiments of the present disclosure include a computer program product of threat similarity analysis for automated action, one or more computer-readable storage medium, and program instructions stored on the one or more computer-readable storage media, the program instruction executable by a processor to cause the processor to perform a method. The method includes receiving, by a threat similarity analysis system, a security alert relating to a security threat from a threat disposition system, performing, by the threat similarity analysis system, a similarity analysis on the security alert using a machine learning model. The similarity analysis compares the security alert with previous security alerts generated within a time window. Additionally, the threat similarity analysis system can apply a cosine similarity analysis to perform the similarity analysis. The method also includes determining, based on the similarity analysis, the security alert matches at least one previous security alert from the previous security alerts within a predetermined set similarity percentage, and associating the security alert into a same security incident as the previous security alert determined by similarity analysis.

Further embodiments of the present disclosure include a system of threat similarity analysis for automated action on security alerts. The system includes a memory, a processor, local data storage having stored thereon computer-executable code. The computer-executable code includes the program instruction executable by a processor to cause the processor to perform the method described above. The system also includes a threat similarity analysis system configured to perform a similarity analysis on security alerts using a machine learning model. The system further includes a threat disposition system configured to perform actions on the security alert based on a threat analysis with a confidence score exceeding a predetermined threshold. The system also includes an alert database configured to store the security alerts for the security alerts generated within an environment. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
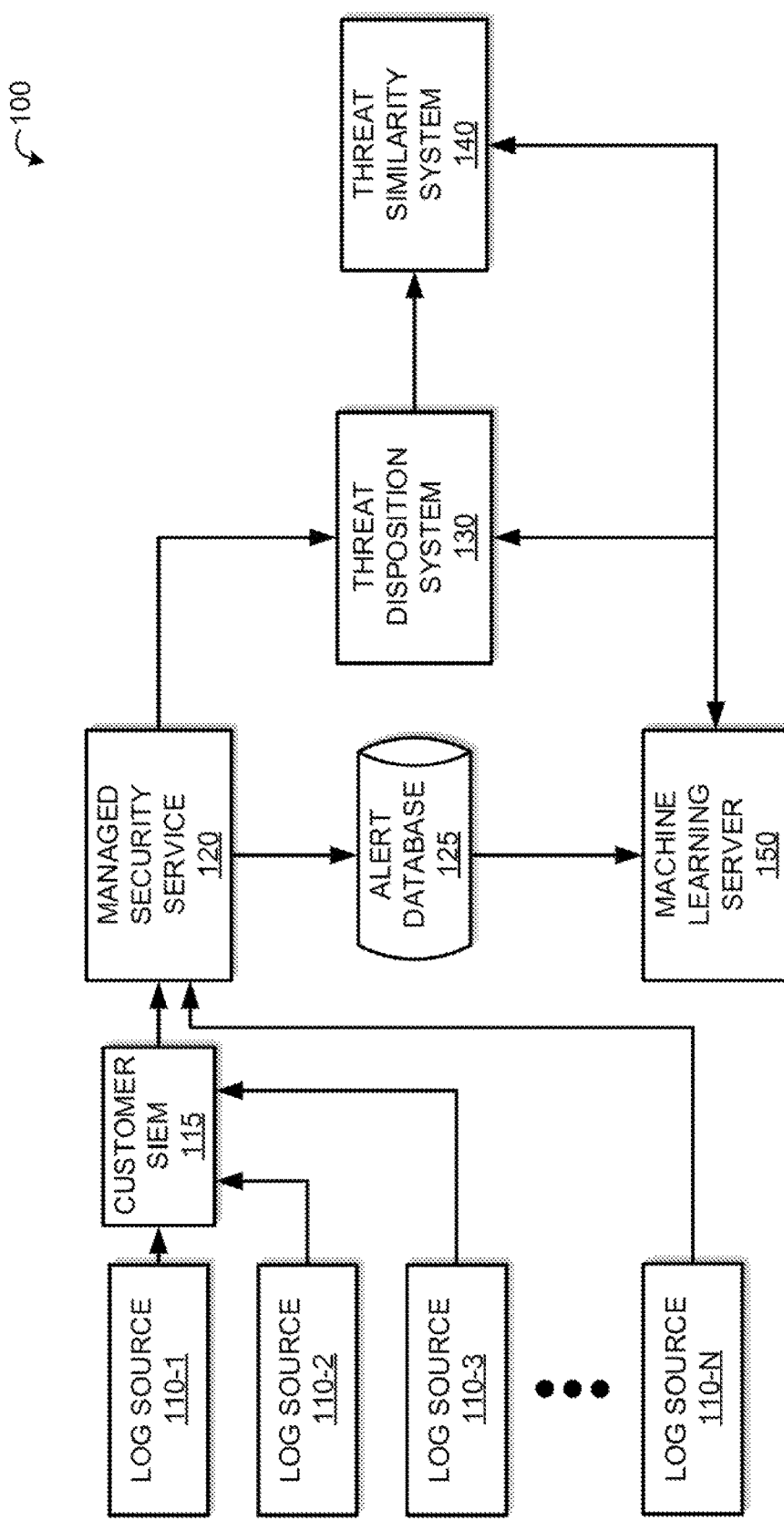
FIG. 1 is a block diagram illustrating an overall solution architecture used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to security alerts, and more specifically, to performing a similarity analysis on security alerts to determine whether an action should be performed on security threats relating to the alert. While the present disclosure is not necessarily limited to such applications, various aspects of the disclosure may be appreciated through a discussion of various examples using this context.

Due to evolving security concerns, enterprises need to take steps to protect themselves against malicious attacks. Managed security services can provide up-to-minute intelligence and deep insight into threat landscapes affecting an enterprise. Managed security services also provide a strategic approach to managing the cost and complexity of the security technologies needed for security event and log management, vulnerability scanning, e-mail security, as well as other security-related activities.

Additionally, managed security services offer an array of solutions, including system and identity monitoring and management, emergency response, and around-the-clock protection from potential security alerts. For example, one solution introduced by IBM is the Advanced Threat Disposition System (ATDS). The ATDS utilizes artificial intelligence (AI) engines to perform advanced threat disposition scoring, which can help categorize security alerts by comparing them with historical and ongoing incidents that have been managed by a team of security analysts. An automated disposition of a security alert can be performed for the threats that receive a high-confidence score from the ATDS.

Another solution provided by managed security services is log management. Log management services include data collection, data normalization, data event taxonomy, data storage, data forwarding, and the like. Data collection can include monitoring incoming data and filtering/parsing log messages that are relevant to the system. Once collected, the logs are normalized. In this step, the raw log data is mapped to its various elements (e.g., source, destination IP address, protocol, priority, contextual data, etc.) Additionally, normalization also categorizes the log resulting in a log message that is a more meaningful piece of information. For example, a log may have a four-digit error code in a log message. This error code, which may be vendor-specific, and can indicate a login failure. During normalization, the error code can be normalized into a word indicating the login failure so as to allow easier analysis of the log.

Organizations can use these log management services to collect and analyze logs. These systems can provide flat-file searching, centralized log collection, compliance-specific reporting, and real-time alerting. Log management services are also capable of using a correlation of capabilities on the system to correlate aggregated logs to specific offenses, which can be analyzed by an analyst. For example, security logs can be analyzed using a static rule-based approach to normalize all vendor security events into a common log object. Additionally, organizations can customize and tune solutions specific to their environment and needs. These logs, as well as other indicators, can be used to determine potential security threats.

Thousands of actionable intelligence events (e.g., "security alerts") are generated daily by correlating billions of log events from thousands of data sources and devices. This enables the security services to detect threats that are specific to certain computer systems/architectures. That is, such systems use customer Security Information and Event Management (SIEM) rules that are specific to a particular Information Technology (IT) environment (e.g., specific hardware, software, workloads, type of enterprise, etc.).

Limitations on managed security services remain, however, as current automated solutions only affect security threats with high probabilities of certainty. This approach misses out on automating lower confidence recommendations. Thus, analysts are required to spend additional time assessing these security alerts to determine if they are related to an open security incident. The work performed by the analysts may also be redundant as these threats can potentially be almost identical to historical threats. Additionally, only the security alerts that are directly audited by security analysts receive the benefit of the audit. Similar security alerts that may be related to the audited alert do not receive the benefits an audit provides.

Embodiments of the present disclosure may overcome the above, and other problems, by using a threat similarity analysis system for performing a threat similarity analysis on security alerts. The threat similarity analysis system can additionally provide automated actions for the security alerts based on the similarity analysis. The automated actions include multiplying the impact of security audits, automating threat escalation by associating security threats into existing security incident investigations, and reperforming an action taken by a security analyst on similar security threats still within their work queue.

More specifically, the threat similarity analysis system can use a machine learning model to analyze threat attributes of security threats to determine similarities between threats. Additionally, the machine learning model can use cosine similarity to determine how similar security alerts are to one another. Cosine similarity is a measure of similarity between two non-zero vectors of an inner product space. Cosine similarity can be used as a similarity function that is a real-valued function that can quantify the similarity between two objects (e.g., the similarity between security threats).

In some embodiments, the threat similarity analysis system reperforms the same action as previously taken by an analyst. For example, a security analyst performs some action on a security alert. Another security alert is detected and received by the threat similarity analysis system with an automated threat disposition to close the threat. However, the confidence score on the decision does not exceed a predetermined confidence threshold. The threat similarity analysis system can perform a similarity analysis on the security alert and compare it with other security alerts generated within a time window. The time window can be a certain number of days that are recent (e.g., one day, three days, seven days, etc.). If the similarity analysis returns a highly similar threat that has been previously actioned, then the action previously performed can be reperformed on the security alert.

In some embodiments, the threat similarity analysis system can perform a similarity analysis on multiple security alerts in a work queue. For example, a security analyst can perform some action on a security alert. When that action occurs, the threat similarity analysis system can perform a similarity analysis on the actioned security alert with the security alerts in the work queue. Based on the similarity analysis, the security alerts in the work queue with high similarity to the action security alert can be recommended to the security analyst. For example, the recommendation can be to perform the same action on those security alerts.

In some embodiments, the threat similarity analysis system automates the auditing process. For example, a security auditor audits a previously actioned security alert and labels the security alert during that process. After the audit is performed, the threat similarity analysis system can perform a threat similarity analysis on the audited security alert with other previously actioned security alerts. Based on the similarity analysis, a determination can be made that the audited security alert is highly similar to at least one previously actioned security alert. A similar security alert can then be tagged with the same labels as the audited security alert.

Referring now to FIG. 1, shown is a high-level block diagram of an overall solution architecture 100, in accordance with embodiments of the present disclosure. The architecture 100 includes log source 110-1, 110-2, 110-3, 110-N (collectively "log sources 110") where N is a variable integer representing any number of possible log sources 110, a customer Security Information and Event Management (STEM) 115, a managed security service 120, an alert database 125, a threat disposition system 130, a threat similarity analysis system 140, and a machine learning server 150. Additional details of the threat similarity analysis system 140 are presented in FIG. 3.

The architecture 100 shown in FIG. 1 can address issues such as the following problem. Assume that the log sources 110 transmit log information to the customer STEM 115 that generates a security alert. For example, the log information indicates that a denial-of-service attack is occurring. The managed security service 120 can make a determination as to how to handle the security alert by transmitting the information to the threat disposition system 130. Additionally, the security alert information can be stored in the alert database 125. The threat disposition system 130 can analyze the security alert and determine a disposition (e.g., escalate or close). However, the threat disposition system 130 only determines an actionable disposition on predictions with a high confidence percentage. If the security alert is lower, such as below 80%, then an automated action does not occur, and the security alert is transmitted to the threat similarity analysis system 140. The threat similarity analysis system can analyze characteristics of the alert against other security alerts to determine if an automated action can occur. For example, the similarity analysis returns a previously actioned security alert that is similar enough to exceed a predetermined set similarity percentage, then the threat similarity analysis system 140 can perform the same action as the previously actioned security alert. Alternatively, and/or in conjunction, the threat similarity analysis system 140 can recommend the action to a security analyst.

The log sources 110 are components of the architecture 100 configured to produce raw logs. The log sources 110 can be push-based or pull-based sources. With push-based log sources 110, the device or application emits a log that is received by a log collector. The transmission can be locally or over a network. Examples of push-based log sources 110 include, but are not limited to, Syslog, Simple Network Management Protocol (SNMP), and the Windows Event Log. Pull-based log sources 110 have an application or mechanism that pulls the logs from the log source 110. Typically, systems that operate in this manner store their log data in a proprietary format. For example, Checkpoint uses the Operational Security (OPSEC) C library that developers can use to pull the logs, while other vendors use databases such as Structured Query Language (SQL), Oracle, My SQL, and the like.

In regard to logs, a log can be viewed as a collection of event records for a single event or related events. An event can be a single occurrence within an environment, usually involving an attempted state change. Events can include a time, an occurrence, and any details that pertain to the event or environment that explain the causes and effects of the event. An event field can describe one characteristic of an event. For example, event fields can be a date, time, source, internet protocol (IP) address, user identification, host identification, and the like. An event record is a collection of event fields that, when taken together, describe a single event.

The logs, such as security logs, can be used as all or part of an audit, which is a process of evaluating logs within an environment. An audit can assess the overall status or identify any notable or problematic activity. Log sources 110 that produce these logs include, for example, systems, user applications, servers operating system components, networking components, network infrastructure components, and the like. When performing an audit, a security alert or alarm can be produced, which is an action taken in response to an event, usually intended to notify an administrator or someone monitoring the environment.

Logs can be additionally classified based on the information provided in the logs. For example, logging can involve security logging, operational logging, compliance logging, application debug logging, and the like. Security logging, for instance, can be primarily focused on detecting and responding to potential attacks, malware infection, data theft, and other security-related issues.

The log sources 110 can also produce the logs using various forms of syntax and format that can be vendor-specific. The syntax and format of a log can define how log messages are formed, transported, stored, reviewed, and analyzed. Typical log formats include, for example, W3C Extended Log File Format (ELF), Apache access log, Cisco Security Device Event Exchange (SDEE)/Cisco Intrusion Detection Event Exchange (CIDEE), ArcSight common event format (CEF), Syslog, Intrusion Detection Message Exchange Format (IDMEF), and the like. However, most logs do not follow a specific or predetermined format and can be considered as free-form text.

The customer SIEM 115 is a component of the architecture 100 configured to provide user behavior analytics, network flow insights, and artificial intelligence components that can detect and orchestrate responses to detected security alerts generated within a customer's environment.

The managed security service 120 is a component of the architecture 100 configured to analyze logs and environment activity to detect security alerts and generate security alerts. Security alerts can be seen as events that occur within an environment that have the potential for harm. The managed security service 120 can analyze these security alerts and determine the impact (i.e., the amount of damage) and the likelihood the threat will occur. The security alerts include attributes such as method, opportunity, and vulnerability. An attacker can exploit a vulnerability within an environment using certain methods. Some of these methods may be only exploitable based on the opportunities an attacker may have. All of these attributes can be gathered and analyzed to determine the impact and likelihood a security alert may have.

Security alerts include, but are not limited to, impersonation attacks, programming vulnerabilities, malicious code (e.g., virus, trojan horse, worm), keylogging, denial-of-service attacks, unchecked/excessive data transfer, physical data loss resulting in loss of availability and/or potential loss of confidentiality, rootkits, unauthorized network access, man-in-the-middle attacks, content forgeries, replay attacks (e.g., cloned radio frequency identification (RFID)), data corruption, and data theft. For instance, a denial-of-service attack denies users access to authorized services or data. An attacker may attempt to perform this type of attack by performing a network flooding attack such as a pinging attack, a smurf attack, an echo-chargen attack, and a SYN flood.

The managed security service 120 can provide countermeasures to prevent these attacks from occurring. These countermeasures include, for example, network monitoring and administration, intrusion detection and prevention, providing strong authentication tools, identifying and classifying faults, ensuring secure software design elements, malicious code detection tools, providing error detection and correcting code, memory separation, as well as providing encryption.

The managed security service 120 is further configured to transfer detected security alerts to the threat disposition system 130 to determine a disposition for the security alerts. These dispositions include, for example, prevention steps (e.g., blocking the attack or closing the vulnerability), deter steps (e.g., making the attack harder to execute), deflection steps (e.g., making another target more attractive), mitigation steps (e.g., making the impact less severe), and detection steps (e.g., detecting as an attack happens or sometime after it occurs). Additionally, the managed security service 120 can store the security alerts in the alert database 125.

The alert database 125 is a component of the architecture 100 configured to store security alerts produced by an environment. The security alerts retained in the alert database 125 can be based on a retention policy that can consider applicable compliance requirements, risk posture, log sources 110, sizes of the alerts generated, available storage options, and the like. The alert database 125 is further configured to store text-based log files, binary log files, and compressed log files. The alert database 125 can be a database that stores the security alerts, Hadoop storage, cloud-based storage, or any combination thereof.

In some embodiments, the alert database 125 is within a storage environment configured to consolidate, manage, and operate data storage. The storage environment can be a server or an aggregation of servers. Examples of the storage environment include storage servers (e.g., block-based storage), direct-attached storage, file servers, server-attached storage, network-attached storage, or any other storage solution. In some embodiments, the components of the storage environment are implemented within a single device. In some other embodiments, the components of the storage environment include a distributed architecture. For example, the storage environment can include multiple storage systems physically located at different locations but are able to communicate over a communication network to achieve the desired result.

The threat disposition system 130 is a component of the architecture 100 configured to provide dispositions of security alerts based on a threat score. In some embodiments, the threat disposition system 130 utilizes a machine learning model stored by the machine learning server 150 to determine a threat score by comparing them with historical and ongoing incidents that have been managed by the managed security service 120. Based on the threat score having a high-confidence (e.g., 90%-100%), the threat disposition system 130 can automate certain steps in the threat management process, such as dismissing false positives and implementing a quarantine on an infected endpoint.

The threat disposition system 130 can determine whether a computer system of a client is under a security attack. The threat disposition system can use machine learning in order to determine whether an offense (e.g., a security alert on a computer system) should be addressed (e.g., escalated to the generation of a ticket/report/action for the offense) or ignored (closed). The decision as to whether the offense should be addressed or ignored can be based on a machine learning process determining the likelihood that the offense is significant enough to warrant further actions. In some embodiments, the threat disposition system 130 predicts what the disposition of the offense should be. This prediction/decision is based on how confident the AI process is that the offense warrants further action.

The machine learning server 150 is a component of the architecture 100 configured to store machine learning models used by systems (e.g., the threat disposition system 130, the threat similarity analysis system 140) within the architecture 100. The machine learning models can be trained using historical security alerts stored in the alert database 125. The similarity analysis predictions and the disposition predictions can be accompanied by confidence scores the machine learning models have in make those respective predictions. For example, the machine learning model can predict that a previously actioned security alert is similar to a security alert being analyzed. Accompanying that prediction can be a confidence score of "95.35%". The confidence score, or similarity percentage, can reflect the machine learning model's confidence in the similarity analysis prediction. A security analyst can utilize that confidence score to either allow an automated action to occur or to choose a different action.

The machine learning models can employ various machine learning techniques in determining a similarity analysis and disposition prediction of a security alert. Machine learning techniques can include algorithms or models that are generated by performing supervised training on a dataset and subsequently applying the generated algorithm or model to generate the similarity analysis prediction between security alerts. Machine learning algorithms can include but are not limited to decision tree learning, association rule learning, artificial neural networks, deep learning, inductive logic programming, support vector machines, clustering, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), hidden Markov models, Gaussian naïve Bayes, multinomial naïve Bayes, averaged one-dependence estimators (AODE), Bayesian network (BN), classification and regression tree (CART), feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the major representative components of an exemplary architecture 100. In some embodiments, however, individual components may have greater or lesser complexity than as represented in FIG. 1, components other than or in addition to those shown in FIG. 1 may be present, and the number, type, and configuration of such components may vary.

Figure 2:
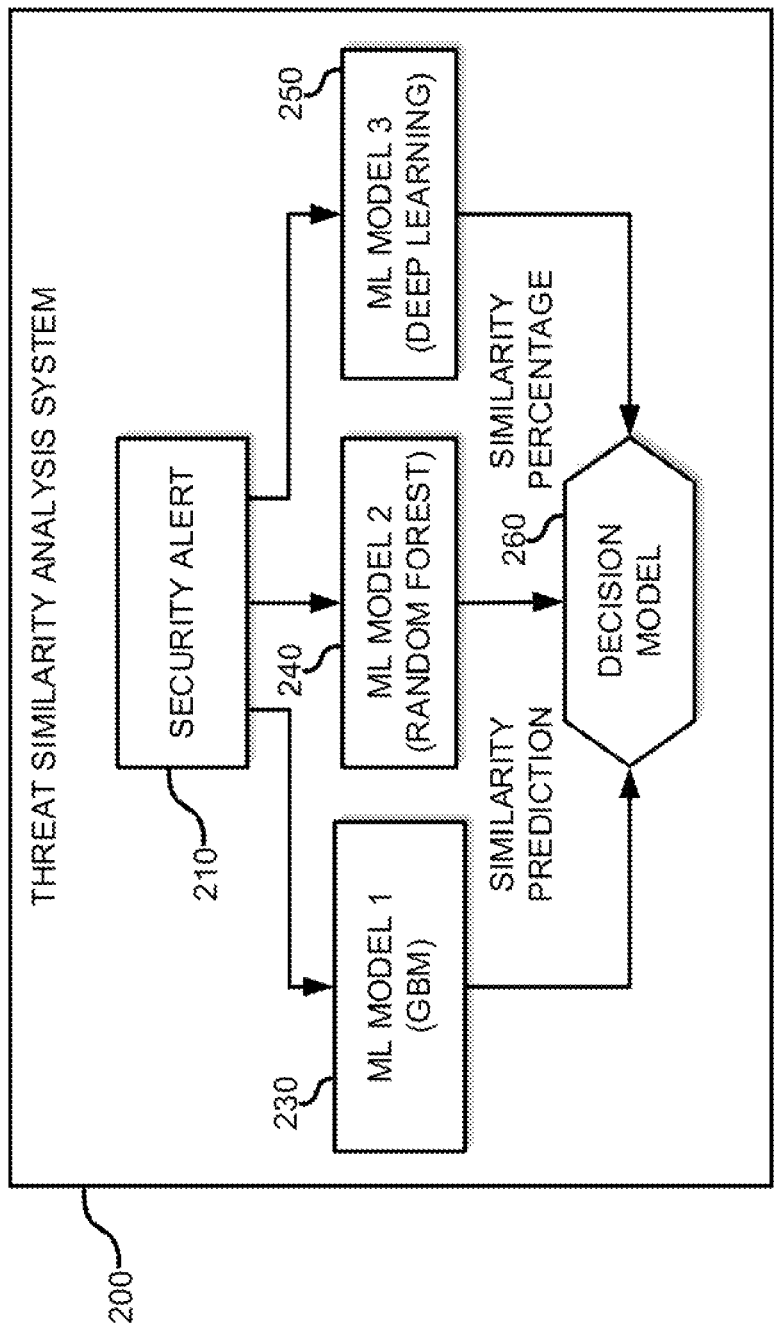
FIG. 2 is a block diagram illustrating a threat similarity analysis system used by one or more embodiments of the present disclosure.

With reference now to FIG. 2, an exemplary threat similarity analysis system 200 (analogous to the threat similarity analysis system 140) is presented. The threat similarity analysis system 200 includes a security alert 210, a machine learning model 1 230, a machine learning model 2 240, a machine learning model 3 250, and a decision model 260.

As shown in FIG. 2, the threat similarity analysis system 200 uses machine learning in order to determine whether security alerts (e.g., a security attack on a computer system) are similar (e.g., automate the same action) to each other or whether they are dissimilar (e.g., escalate to a security analyst for the generation of a ticket/report/action for the alert). The decision as to whether the security alert should be actioned or escalated is based on a machine learning process determining the similarity between security alerts. That is, the threat similarity analysis system 200 predicts whether security alerts are similar.

In some embodiments, the similarity analysis prediction is based on how confident the AI process is in the similarity. Based on the similarity analysis and the similarity percentage, an automated action can occur. For example, the threat similarity analysis system 200 can perform an analysis on a security alert and a previously actioned security alert. Assume that upon completing the analysis that the similarity between the two alerts is at 99%, then the action that was performed on the previously actioned security alert can be performed on the security alert.

Figure 3:
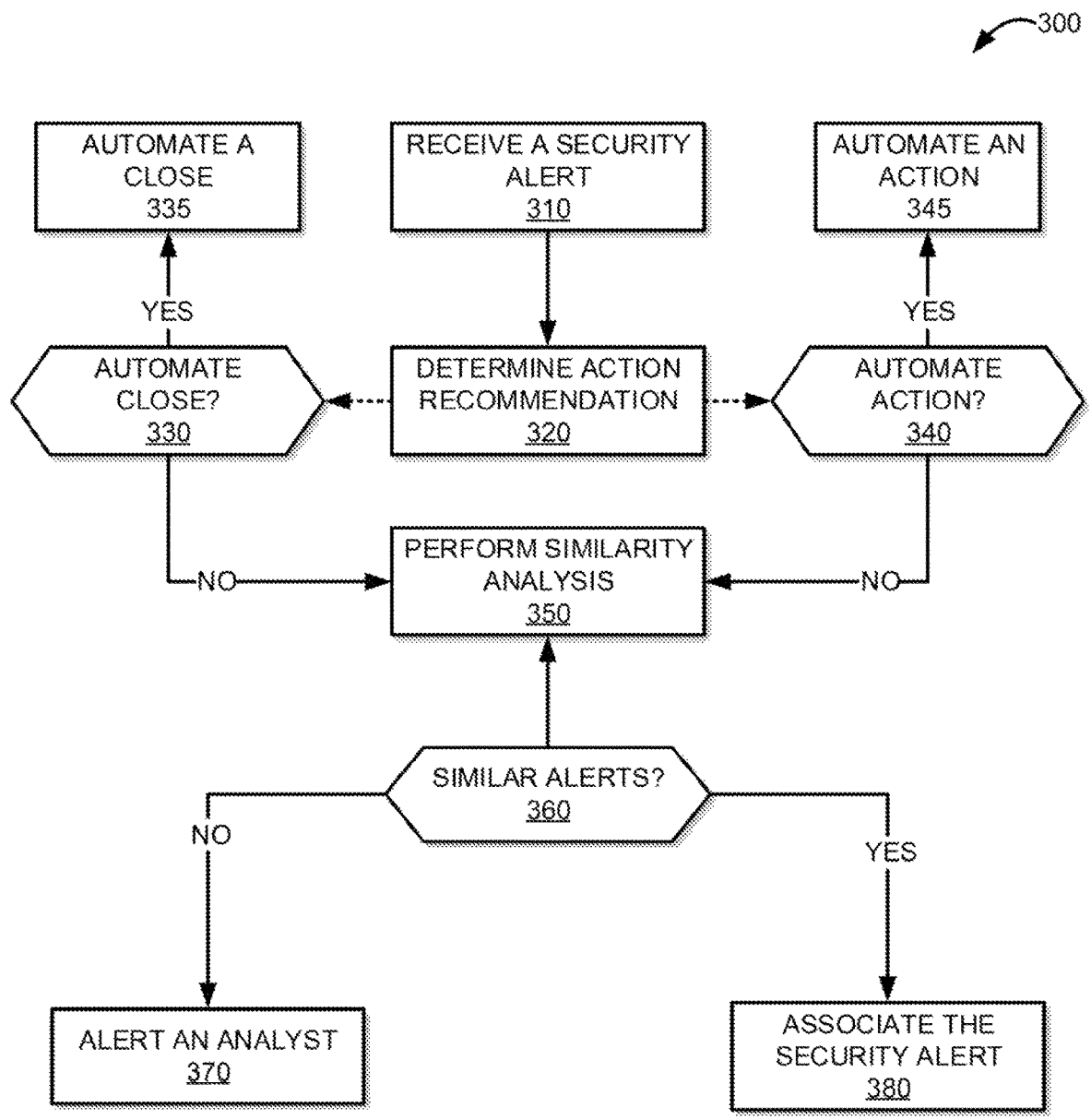
FIG. 3 is a flow diagram illustrating a process of performing a threat similarity analysis on a security alert performed in accordance with embodiments of the present disclosure.

As shown in FIG. 3, various types of machine learning processes can be used in various embodiments of the present disclosure. Different embodiments may use one, two, or all three of the machine learning processes depicted by the machine learning model 1 230, the machine learning model 2 240, and the machine learning model 3 250 when performing the similarity analysis.

The machine learning model 1 230 represents a gradient boost machine (GBM) machine learning process, which uses multiple decision trees that utilize each other's analysis, thus "boosting" the process in order to learn. For example, assume that the first decision tree is a "weak learner" that has many errors when making a prediction based on a set of input data. These errors are weighted such that they are heavily used to retrain a model/decision tree. The process continues until the final model/decision tree is effective at properly predicting a correct output based on any input data.

The machine learning model 2 240 represents a random forest machine learning process, which also uses decision trees, but randomly combines decision trees into a "random forest" of trees. This allows the system to bag features in different decision trees such that features in a particular limb/node in various decision trees that are very strong predictors can describe the different trees as they are correlated. A particular feature that turns out to be a good predictor of some outcome in different decision trees makes these different decision trees correlated, as they produce the same accurate prediction from the same feature.

The machine learning model 3 250 represents a deep learning machine learning model. For example, a deep learning model can be a convolutional neural network, a recurrent neural network, and the like. In some embodiments, machine learning models 230, 240, 250 are stored in a machine learning model server (analogous to machine learning server 150) that the threat similarity analysis system 200 accesses.

While shown as using only three different machine learning processes, the threat similarity analysis system 200 can utilize various other machine learning techniques as described above. These machine learning techniques can provide a threat similarity analysis prediction accompanied by a similarity percentage (e.g., a confidence score). Thus, the threat similarity analysis system 200 can perform a previous action from an actioned/historical security alert or can escalate the alert to an analyst based on a set threshold and decision logic.

It is noted that FIG. 2 is intended to depict the major representative components of an exemplary threat similarity analysis system 200. In some embodiments, however, individual components may have greater or lesser complexity than as represented in FIG. 2, components other than or in addition to those shown in FIG. 2 may be present, and the number, type, and configuration of such components may vary.

FIG. 3 is a flow diagram illustrating a process 300 of performing a threat similarity analysis, in accordance with embodiments of the present disclosure. The process 300 may be performed by hardware, firmware, software executing on a processor, or a combination thereof. For example, any or all the steps of the process 300 may be performed by one or more processors embedded in a computing device.

A security alert is received (e.g., within the architecture 100) for analysis. This is illustrated at step 310. The security alert can be based on an analysis of the log produced by the log sources 110. The security alert can include some kind of security alert such as malicious code detected, keylogging, denial-of-service attack, etc., that could be occurring in a client's environment. Once received, the managed security service 120 transmits the security alert to the threat disposition system 130 for further analysis and potential automated disposition.

The threat disposition system 130 determines a disposition for the security alert. This is illustrated at step 320. The threat disposition system 130 can utilize a machine learning model stored by the machine learning server 150 to determine a threat score by comparing them with historical and ongoing incidents that have been managed by the managed security service 120. Based on the threat score having a high-confidence (e.g., 90%-100%), the threat disposition system 130 can automate certain steps in the threat management process, such as dismissing false positives and implementing a quarantine on an infected endpoint. The decision as to whether the offense should be addressed or ignored can be based on a machine learning process determining the likelihood that the offense is significant enough to warrant further actions.

The disposition can be either to automate a close 330 or to automate some action 340. The confidence percentage is analyzed if the threat disposition system 130 decides to automate a close 330. Confidence percentages having a high-confidence (e.g., a set threshold determined by an analyst) are allowed to be automated. As such, when the threat disposition system 130 predicts a disposition of close and that prediction is accompanied by a high-confidence percentage, then an automated close 335 is performed.

The confidence percentage is also analyzed in cases when the threat disposition system 130 predicts a disposition to perform an action (e.g., escalate the security alert). 340. Confidence percentages having a high-confidence (e.g., a set threshold determined by an analyst) are allowed to be automated. As such, when the threat disposition system 130 predicts a disposition of automating an action and that prediction is accompanied by a high-confidence percentage, then an automated action 335 is performed.

However, in situations when the threat disposition system 130 does not have a high confidence prediction on its disposition prediction, the threat alert is sent to the threat similarity analysis system 140 for further analysis. At this point, the threat similarity analysis system performs a similarity analysis on the security alert. This is illustrated at step

350. The threat similarity analysis system 140 can use a machine learning model stored in the machine learning server 150 to analyze threat attributes of security alerts to determine similarities between threats. Additionally, the machine learning model can use cosine similarity to determine how similar security alerts are to one another.

The similarity analysis can be performed by comparing the security alert against at least one historical security alerts. The threat attributes of the alerts can be analyzed to determine the similarity between the alerts. Once performed, the threat similarity analysis system 140 returns the historical alert that is similar as well as a similarity percentage reflecting how similar the system believes the alerts are.

A determination is made as to whether the similarity percentage exceeds a similarity threshold (e.g., a set threshold determined by an analyst). This is illustrated at step 360. If the similarity analysis does not exceed the threshold, then the alert can be generated that alerts an analyst that the security alert requires further analysis. This is illustrated at step 370. However, if the similarity percentage exceeds the threshold, then the security alert can be associated with the security incident of the similar alert. This is illustrated at step 380. Alternatively, or in addition to, the threat similarity analysis system 140 can perform the same action on the security alert as the action performed on the similar alert. In some embodiments, instead of automating the action, the threat similarity analysis system 140 can provide an action recommendation to a security analyst. The action used by a similar threat can be the recommendation sent to the analyst. For example, if the previous action was a close decision, then the recommendation would also be to close the security alert being analyzed.

Figure 4:
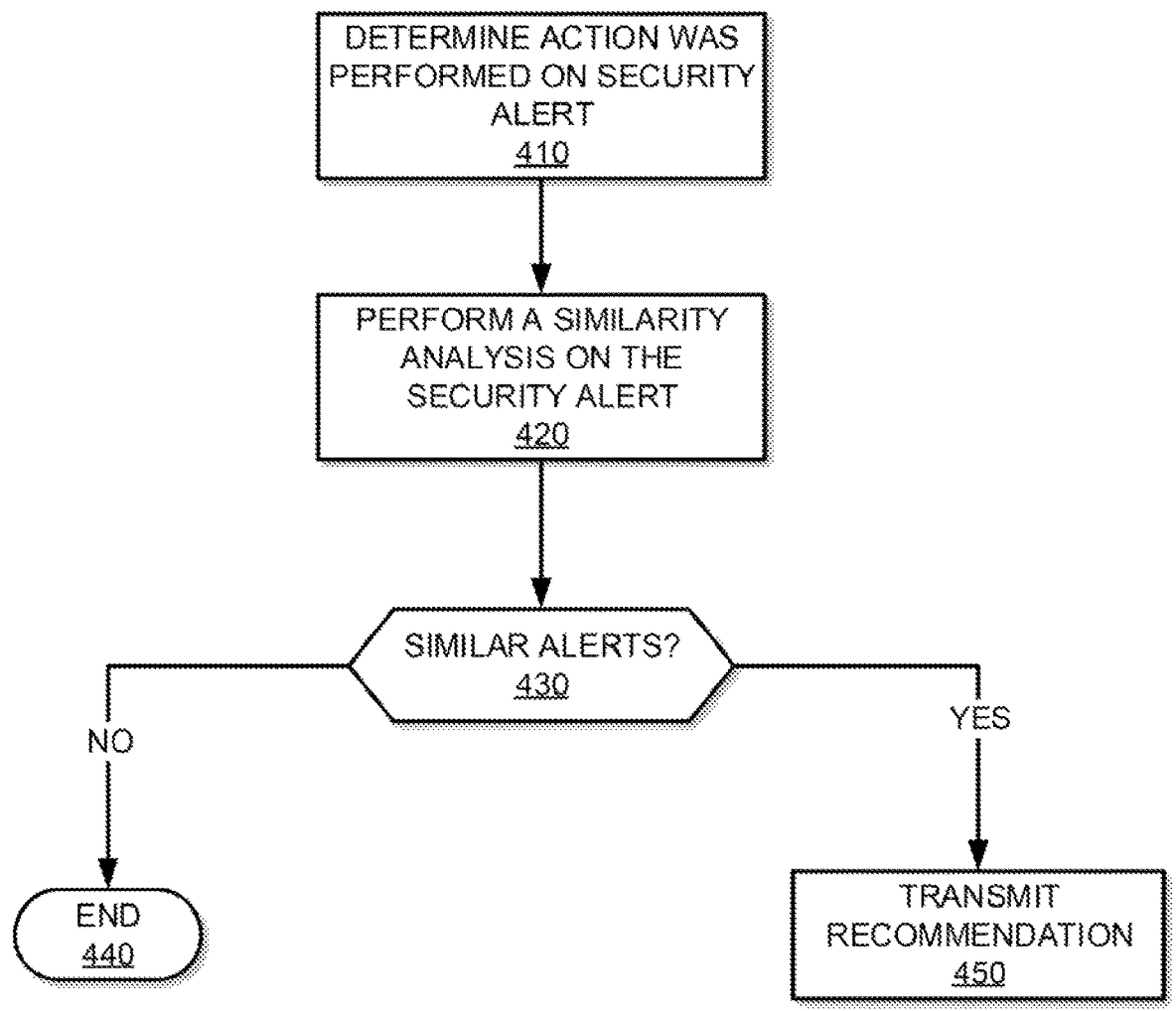
FIG. 4 is a flow diagram illustrating a process of performing a threat similarity analysis on an actioned security alert performed in accordance with embodiments of the present disclosure.

FIG. 4 is a flow diagram illustrating a process 400 of performing a threat analysis on an actioned security alert, in accordance with embodiments of the present disclosure. The process 400 may be performed by hardware, firmware, software executing on a processor, or a combination thereof. For example, any or all the steps of the process 400 may be performed by one or more processors embedded in a computing device.

A determination is made that an action was performed on a security alert. This is illustrated at step 410. The determination can be a relay from a threat monitoring user interface that a security analyst interfaces with to perform actions on security alerts. Once an action is determined, the actioned security alert can be sent to the threat similarity analysis system 140 for analysis. Additionally, unanalyzed security alerts in a work queue can also be sent for analysis so they can be compared with the actioned security alert. The work queue can be a list of unanalyzed security alert an analyst is working on that have been awaiting some kind of action.

The threat similarity analysis system 140 performs a similarity analysis on the actioned security alert with the unanalyzed security alerts from the work queue. This is illustrated at step 420. The threat similarity analysis system 140 can use a machine learning model stored in the machine learning server 150 to analyze threat attributes of security alerts to determine similarities between threats. Additionally, the machine learning model can use cosine similarity to determine how similar security alerts are to one another.

The similarity analysis can be performed by comparing the security alert against at least one unanalyzed security alert. The threat attributes of the alerts can be analyzed to determine the similarity between the alerts. Once performed, the threat similarity analysis system 140 returns any unanalyzed security alerts in the work queue that are similar as well as a similarity percentage reflecting how similar the system believes the alerts are to the actioned security alert.

A determination is made as to whether any of the similar security alerts exceed a similarity threshold (e.g., a set threshold determined by an analyst). This is illustrated at step 430. If the similarity percentage does not exceed the similarity threshold, then no action is taken, as the unanalyzed security alerts in the work queue are not similar enough to perform or recommend an action. This is illustrated at step 440. However, for the unanalyzed security alerts in the work queue with a similarity percentage exceeding the threshold, those alerts can be transmitted to an analyst with a recommendation that the same action be performed as the actioned security alert. This is illustrated at step 440. For example, if the previous action taken was to close, then the recommendation would also be to close the similar security alerts in the work queue.

Figure 5:
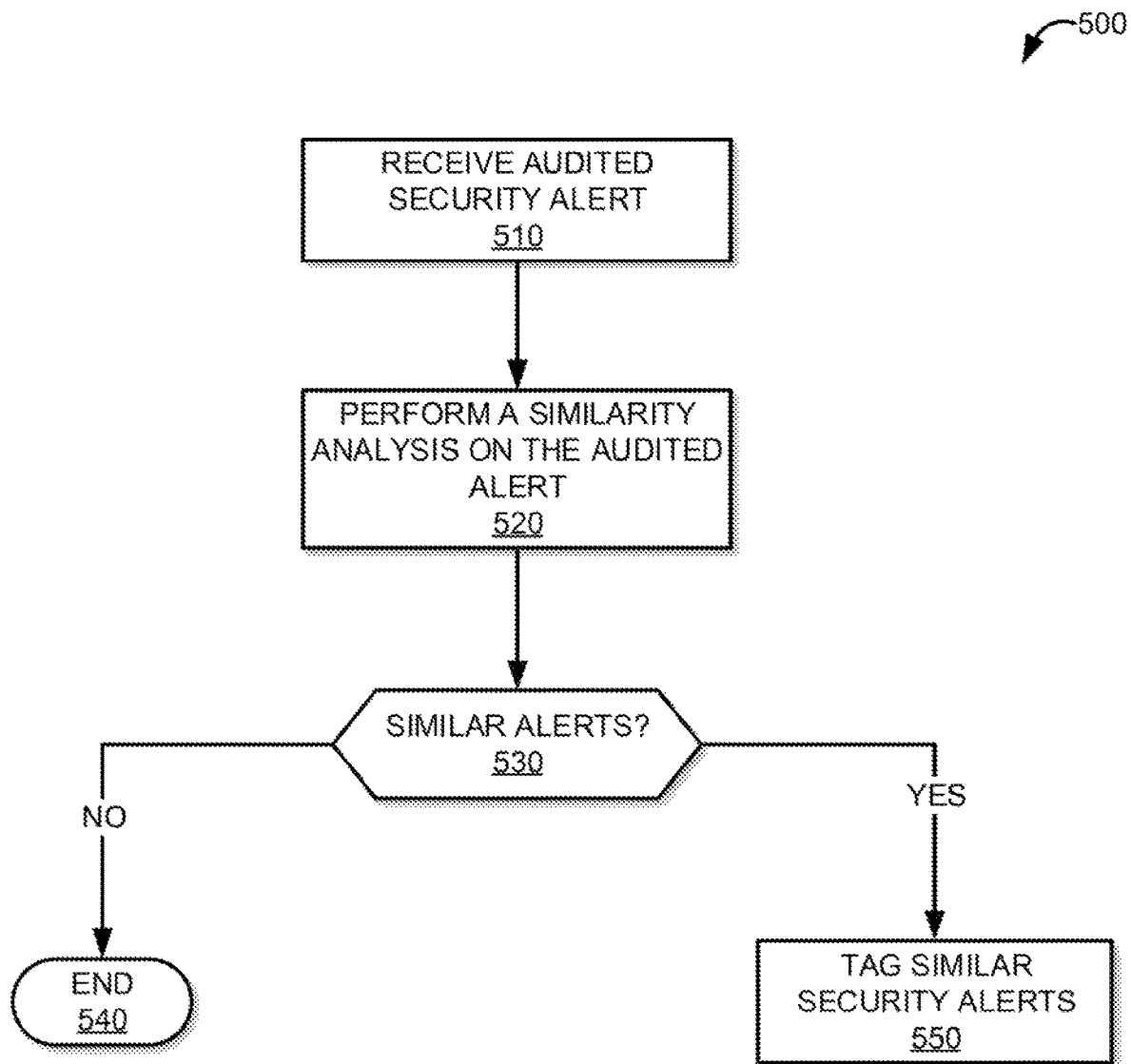
FIG. 5 is a flow diagram illustrating a process of performing a threat similarity analysis on an audited security alert performed in accordance with embodiments of the present disclosure.

FIG. 5 is a flow diagram illustrating a process 500 of performing a threat analysis on an audited security alert, in accordance with embodiments of the present disclosure. The process 500 may be performed by hardware, firmware, software executing on a processor, or a combination thereof. For example, any or all the steps of the process 500 may be performed by one or more processors embedded in a computing device.

A determination is made that an audit was performed on a security alert. This is illustrated at step 410. The determination can be a relay from a threat monitoring user interface that a security auditor interfaces with to perform audits on security alerts. Once an audit is performed, the audited security alert can be sent to the threat similarity analysis system 140 for analysis. Additionally, previously actioned security alerts can also be sent for analysis so they can be compared with the audited security alert.

The threat similarity analysis system 140 performs a similarity analysis on the audited security alert with the previously actioned security alerts. This is illustrated at step 520. The threat similarity analysis system 140 can use a machine learning model stored in the machine learning server 150 to analyze threat attributes of security alerts to determine similarities between threats. Additionally, the machine learning model can use cosine similarity to determine how similar security alerts are to one another.

The similarity analysis can be performed by comparing the audited security alert against at least one previously actioned security alert. The threat attributes of the alerts can be analyzed to determine the similarity between the alerts. Once performed, the threat similarity analysis system 140 returns any alert from the previously actioned alerts that are similar as well as a similarity percentage reflecting how similar the system believes the alerts are to the audited security alert.

A determination is made as to whether any of the similar security alerts exceed a similarity threshold (e.g., a set threshold determined by an analyst). This is illustrated at step 530. If the similarity percentage does not exceed the similarity threshold, then no action is taken as the previously actioned security alerts are not similar enough. This is illustrated at step 540. However, for the previously actioned security alerts with similarity percentages exceeding the threshold, those alerts can be transmitted to an analyst with a recommendation that the same audit tags be performed as performed on the audited security alert. This is illustrated at step 550.

Figure 6:
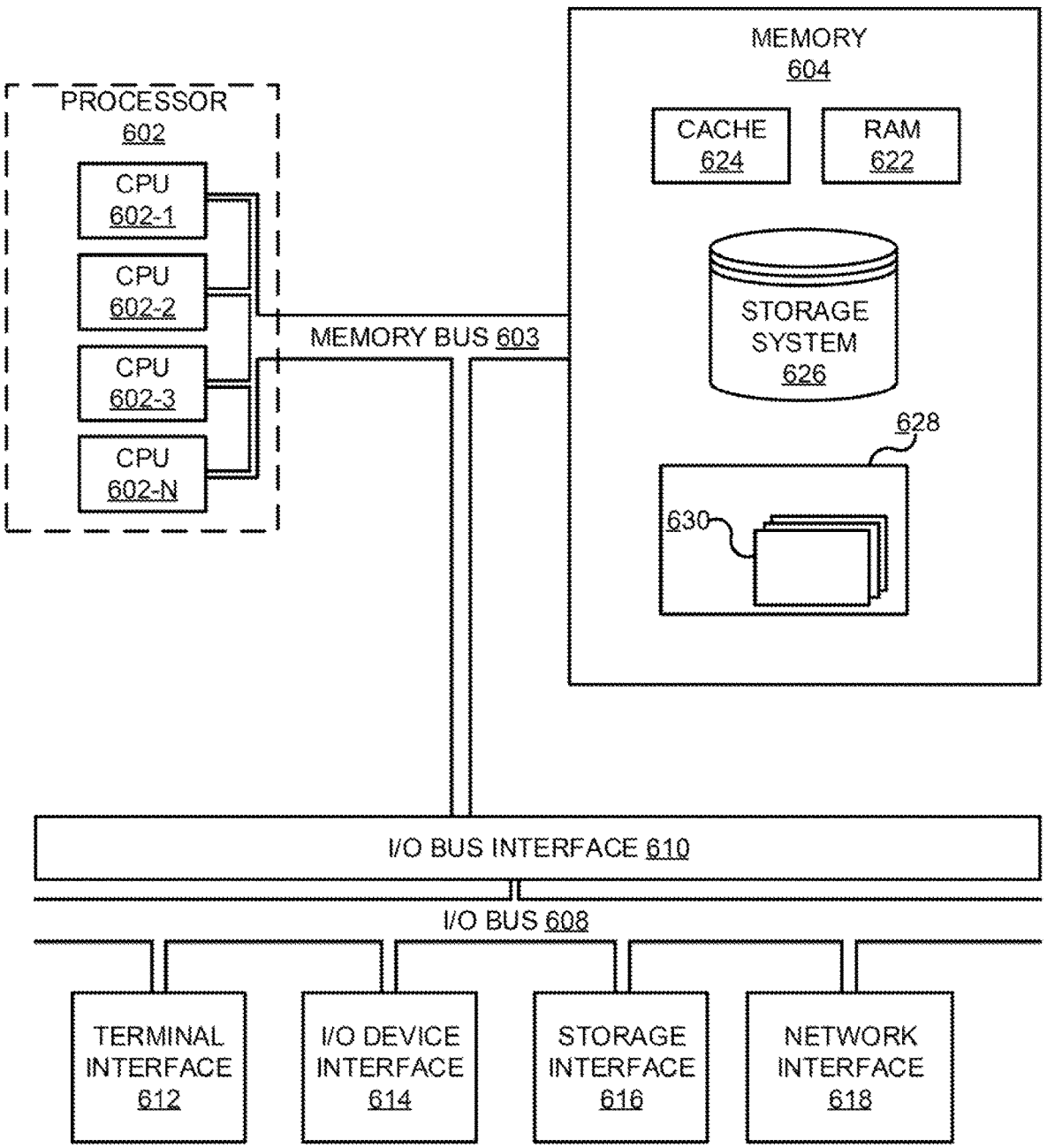
FIG. 6 is a high-level block diagram illustrating an example computer system that may be used in implementing one or more of the methods, tools, and modules, and any related functions, described herein in which the disclosure may be implemented.

Referring now to FIG. 6, shown is a high-level block diagram of an example computer system 600 (e.g., the threat similarity analysis system 200) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 602 may execute instructions stored in the memory 604 and may include one or more levels of onboard cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments, some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 (e.g., the threat similarity analysis system 200), may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
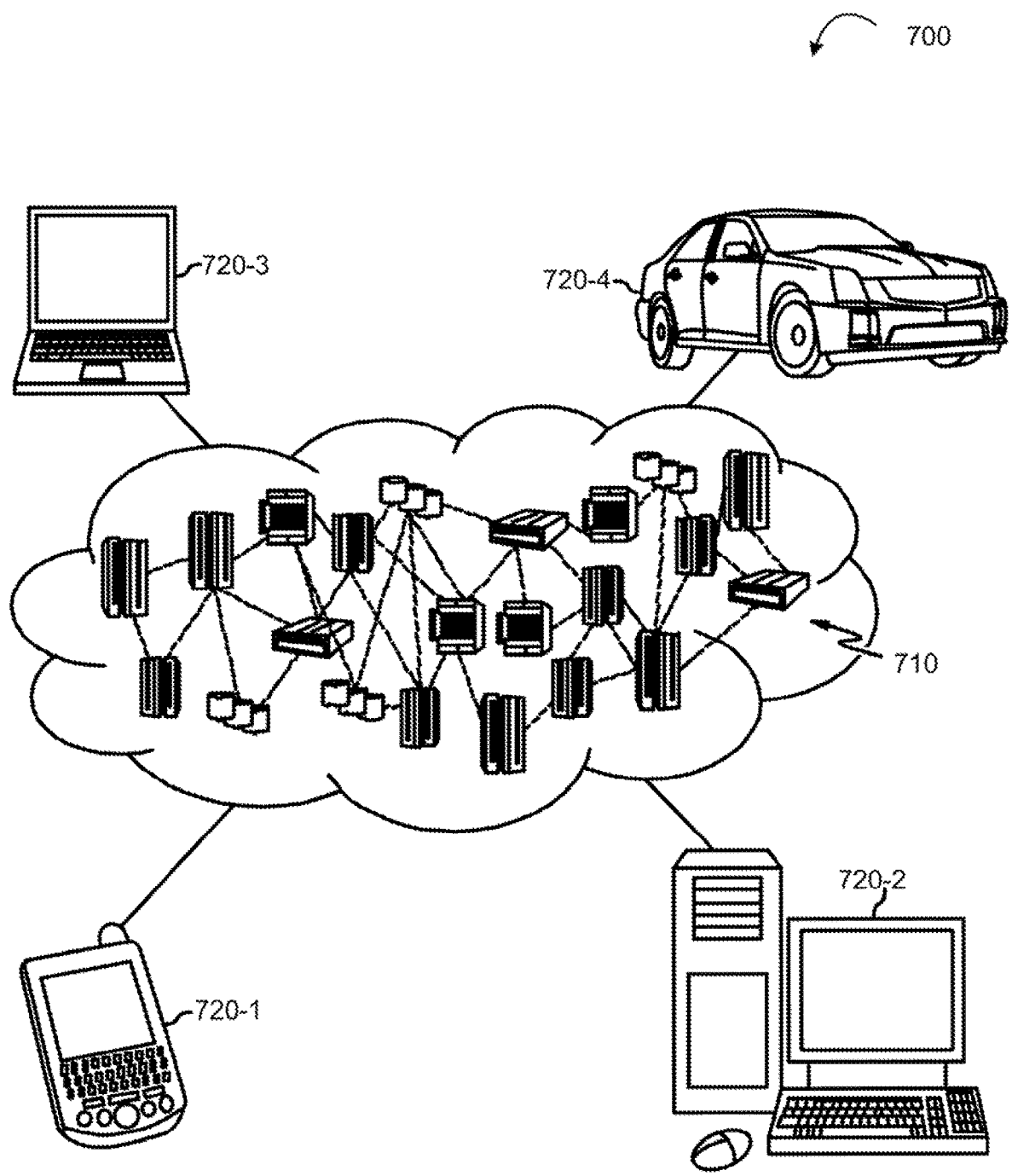
FIG. 7 depicts a cloud computing environment in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (P.D.A.) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
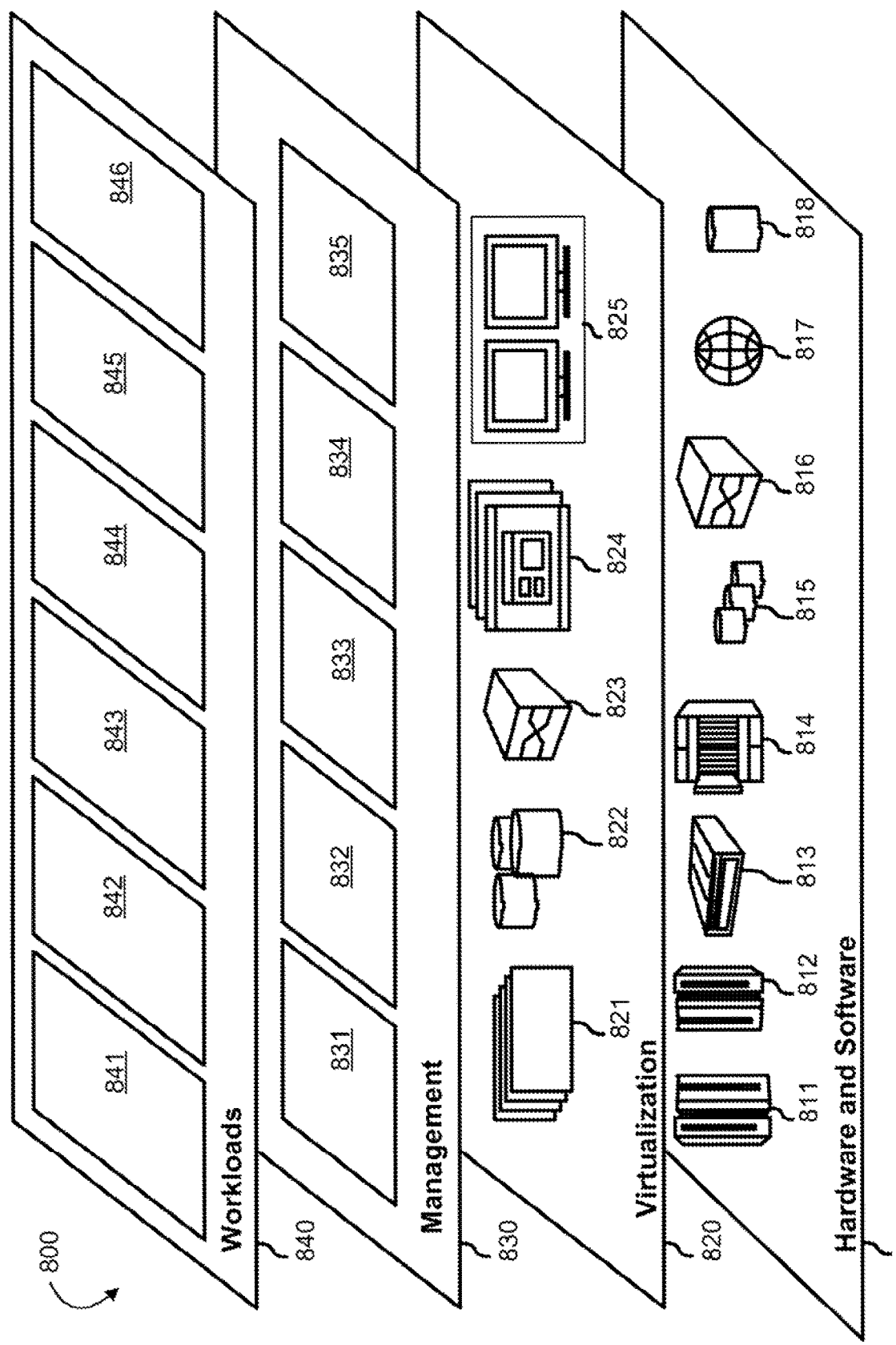
FIG. 8 depicts abstraction model layers in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (S.L.A.) planning and fulfillment 835 provide pre-arrangement for, and procurement of, cloud computing resources for which a future requirement is anticipated in accordance with an S.L.A.

Workloads layer 840 provides examples of functionality for which the cloud computing environment may be utilized. Examples of workloads and functions which may be provided from this layer include mapping and navigation 841; software development and lifecycle management 842 (e.g., the threat similarity analysis system 200); virtual classroom education delivery 843; data analytics processing 844; transaction processing 845; and a threat similarity analysis system 846.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of threat similarity analysis for automated action on security alerts, the method comprising:
   receiving a security alert relating to a security threat by a threat disposition system;
   analyzing, by the threat disposition system, the security alert;
   producing a close decision and a confidence score relating to the close decision based on the analysis performed by the threat disposition system;
   determining if the confidence score exceeds a predetermined confidence threshold,
      wherein,
      if the confidence score exceeds the predetermined confidence threshold, performing an automated action on the security alert, and
      if the confidence score does not exceed the predetermined confidence threshold, transmitting the security alert to a threat similarity analysis system;
   receiving, by the threat similarity analysis system, the transmitted security alert from the threat disposition system;
   performing, by the threat similarity analysis system, a similarity analysis on the transmitted security alert using a machine learning model, wherein the similarity analysis compares the transmitted security alert with previous security alerts within a time window.

2. The method of claim 1, wherein the security alert was escalated by the threat disposition system.

3. The method of claim 1, further comprising:
   determining an action was performed on the previous security alert; and
   performing the action on the security alert.

4. The method of claim 1, further comprising:
   determining an action was performed on a second security alert;
   performing, by the threat similarity analysis system, a second similarity analysis on the second security alert using the machine learning model, wherein the similarity analysis compares the second security alert with a plurality of unanalyzed security alerts generated in the environment;
   determining, based on the second similarity analysis, the second security alert matches at least one unanalyzed security alert from the unanalyzed security alerts within the predetermined degree; and
   transmitting a recommendation that the action be performed on the at least one unanalyzed security alert.

5. The method of claim 1, further comprising:
receiving, by the threat similarity analysis system, an audited security alert, wherein the audited security alert is labeled with at least one audit tag;
performing, by the threat similarity analysis system, the similarity analysis on the audited security alert using the machine learning model, wherein the similarity analysis compares the audited security alert with previously actioned security alerts;
determining, based on the similarity analysis, the audited security alert matches at least one previously actioned security alert from the previously actioned security alerts within the predetermined degree; and
tagging the previously actioned security alert with the audit tag.

6. The method of claim 1, wherein the threat similarity analysis system compares threat attributes from the security alert with other threat attributes of the previous security alerts to perform the similarity analysis.

7. The method of claim 1, wherein the threat similarity analysis system applies a cosine similarity analysis to perform the similarity analysis.

8. The method of claim 1, wherein, if the similarity percentage exceeds a threshold similarity percentage, performing the associating step, and if the similarity percentage does not exceed the threshold similarity percentage, alerting an analyst that the transmitted security alert requires further analysis.

9. A computer program product including computer readable storage media for threat similarity analysis for automated action on security alerts, having computer executable instructions that when executed by at least one computer case the at least one computer to execute the instructions to:
receive a security alert relating to a security threat by a threat disposition system;
analyze, by the threat disposition system, the security alert;
produce a close decision and a confidence score relating to the close decision based on the analysis performed by the threat disposition system;
determine if the confidence score exceeds a predetermined confidence threshold,
wherein,
if the confidence score exceeds the predetermined confidence threshold, perform an automated action on the security alert, and
if the confidence score does not exceed the predetermined confidence threshold, transmit the security alert to a threat similarity analysis system;
receive, by the threat similarity analysis system, the transmitted security alert from the threat disposition system;
perform, by the threat similarity analysis system, a similarity analysis on the transmitted security alert using a machine learning model, wherein the similarity analysis compares the transmitted security alert with previous security alerts within a time window;
determine, based on the similarity analysis, the transmitted security alert matches at least one previous security alert from the previous security alerts within a predetermined degree; and
associate the transmitted security alert into a same security incident as the previous security alert determined by similarity analysis.

10. The computer program product of claim 9, wherein the security alert was escalated by the threat disposition system.

11. The computer program product of claim 9, further comprising instructions to:
receive the security alert by the threat disposition system;
analyze, by the threat disposition system, the security alert relating to the security threat;
produce a close decision and a confidence score relating to the close decision based on the analysis performed by the threat disposition system;
determine the confidence score does not exceed a predetermined confidence threshold; and
transmit the security alert to the threat similarity analysis system.

12. The computer program product of claim 9, further comprising instructions to:
determine an action was performed on the previous security alert; and
perform the action on the security alert.

13. The computer program product of claim 9, further comprising instructions to:
determine an action was performed on a second security alert;
perform, by the threat similarity analysis system, a second similarity analysis on the second security alert using the machine learning model, wherein the similarity analysis compares the second security alert with a plurality of unanalyzed security alerts generated in the environment;
determine, based on the second similarity analysis, the second security alert matches at least one unanalyzed security alert from the unanalyzed security alerts within the predetermined degree; and
transmit a recommendation that the action be performed on the at least one unanalyzed security alert.

14. The computer program product of claim 9, further comprising instructions to:
receive, by the threat similarity analysis system, an audited security alert, wherein the audited security alert is labeled with at least one audit tag;
perform, by the threat similarity analysis system, the similarity analysis on the audited security alert using the machine learning model, wherein the similarity analysis compares the audited security alert with previously actioned security alerts;
determine, based on the similarity analysis, the audited security alert matches at least one previously actioned security alert from the previously actioned security alerts within the predetermined degree; and
tag the previously actioned security alert with the audit tag.

15. The computer program product of claim 9, wherein the threat similarity analysis system compares threat attributes from the security alert with other threat attributes of the previous security alerts to perform the similarity analysis.

16. The computer program product of claim 9, wherein the threat similarity analysis system applies a cosine similarity analysis to perform the similarity analysis.

17. A system of threat similarity analysis for automated action on security alerts, the system comprising:
a memory;
a processor;
local data storage having stored thereon computer executable code, wherein the computer executable code includes the program instruction executable by a processor to cause the processor to perform a method;
a threat disposition system that performs actions on a security alert based on a threat analysis with a confidence score exceeding or not exceeding a predetermined threshold that includes transmitting the security alert to a threat similarity analysis system when the confidence score does not exceed the predetermined threshold; and the threat similarity analysis system that performs a similarity analysis on the security alert using a machine learning model, wherein the threat similarity analysis system compares the security alert with previous security alerts within a time window.

18. The system of claim 17, wherein the threat similarity analysis system compares threat attributes from the security alert with other threat attributes of the previous security alerts to perform the similarity analysis.

19. The system of claim 17, wherein the threat similarity analysis system-applies a cosine similarity analysis to perform the similarity analysis.

20. The system of claim 17, further comprising:
an alert database that stores the security alerts and the security alerts generated within an environment.

* * * * *